(12) United States Patent
Wolff et al.

(10) Patent No.: US 9,696,764 B2
(45) Date of Patent: Jul. 4, 2017

(54) DUAL-PART HINGE ASSEMBLY

(71) Applicant: HEWLETT-PACKARD DEVELOPMENT COMPANY, L.P., Houston, TX (US)

(72) Inventors: Stacy L Wolff, Houston, TX (US); Chad Patrick Paris, Houston, TX (US); Eric Chen, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/779,173

(22) PCT Filed: Apr. 18, 2013

(86) PCT No.: PCT/US2013/037112
§ 371 (c)(1),
(2) Date: Sep. 22, 2015

(87) PCT Pub. No.: WO2014/171942
PCT Pub. Date: Oct. 23, 2014

(65) Prior Publication Data
US 2016/0054761 A1   Feb. 25, 2016

(51) Int. Cl.
*H05K 7/00* (2006.01)
*G11B 33/02* (2006.01)
*G06F 1/16* (2006.01)
*E05D 7/10* (2006.01)
*E05D 13/00* (2006.01)

(52) U.S. Cl.
CPC ............. *G06F 1/1681* (2013.01); *E05D 7/10* (2013.01); *E05D 13/14* (2013.01); *G06F 1/166* (2013.01); *G06F 1/1654* (2013.01); *E05D 2007/1094* (2013.01)

(58) Field of Classification Search
CPC ....................................................... G06F 1/1616
USPC ....................................................... 361/679.29
See application file for complete search history.

(56) References Cited

U.S. PATENT DOCUMENTS

| | | |
|---|---|---|
| 6,460,221 B1 | 10/2002 | Eromaeki |
| 6,831,229 B1 * | 12/2004 | Maatta ................ G06F 1/1616 174/50 |
| 7,055,215 B1 | 6/2006 | Ligtenberg et al. |
| 7,089,628 B2 | 8/2006 | Lin et al. |
| 7,148,874 B2 | 12/2006 | Anzai et al. |
| 8,050,017 B2 | 11/2011 | Riddiford |
| 2004/0251391 A1 | 12/2004 | Kuratomi et al. |

(Continued)

FOREIGN PATENT DOCUMENTS

| | | |
|---|---|---|
| EP | 2952075 A1 | 12/2015 |
| TW | 201137565 A | 11/2011 |

(Continued)

*Primary Examiner* — Jerry Wu
(74) *Attorney, Agent, or Firm* — HP Patent Department

(57) ABSTRACT

Embodiments of the present invention disclose a dual-part hinge assembly for a portable electronic device. According to one embodiment, the portable computing device includes a display and a base housing connected via the dual-part hinge assembly. Furthermore, the dual-part hinge assembly comprises a first portion and a second portion that extends behind the first portion when the display transitions to an open position so as to provide stability for the computing device.

18 Claims, 7 Drawing Sheets

(56) References Cited

U.S. PATENT DOCUMENTS

| | | | |
|---|---|---|---|
| 2005/0168925 A1* | 8/2005 | Fang | G06F 1/1632 361/679.07 |
| 2006/0077622 A1 | 4/2006 | Keely et al. | |
| 2007/0121282 A1 | 5/2007 | Ho | |
| 2009/0244009 A1 | 10/2009 | Staats et al. | |
| 2011/0038119 A1 | 2/2011 | Yeh | |
| 2011/0222238 A1 | 9/2011 | Staats et al. | |

FOREIGN PATENT DOCUMENTS

| | | |
|---|---|---|
| TW | 201303554 A | 1/2013 |
| WO | WO-2009034484 | 3/2009 |

* cited by examiner

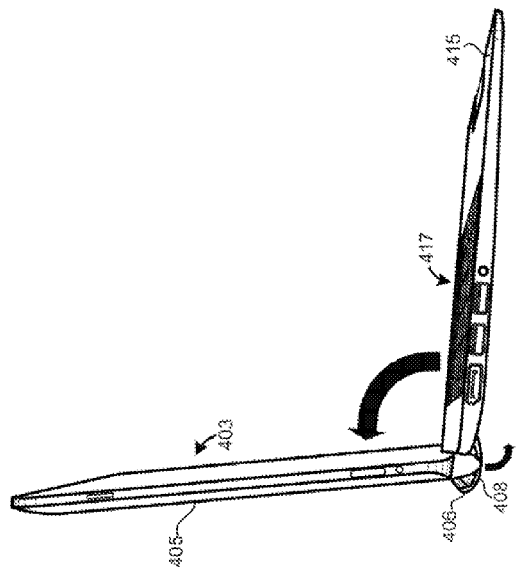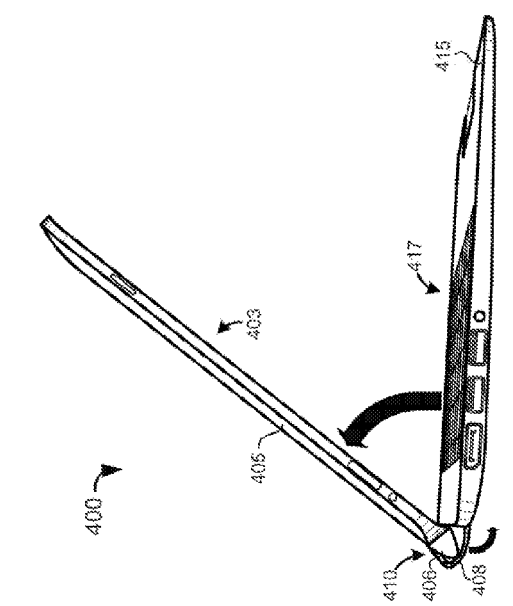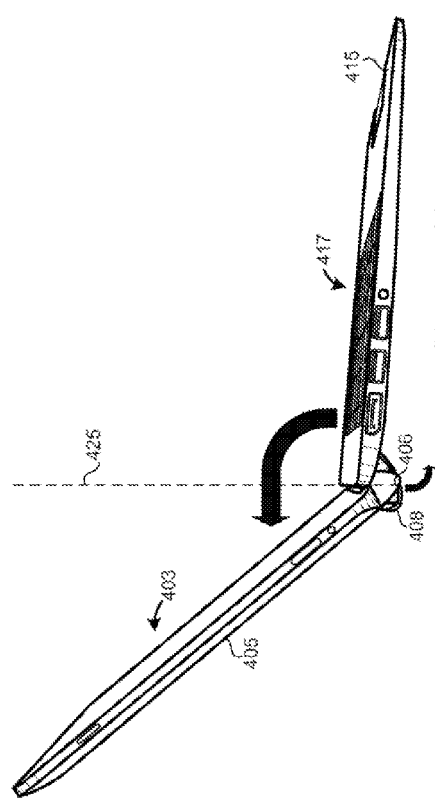

DUAL-PART HINGE ASSEMBLY

BACKGROUND

The emergence and popularity of mobile computing has made portable electronic devices, due to their compact design and light weight, a staple in today's marketplace. Within the mobile computing realm, notebook computers are one of the most-widely used devices and generally employ a clam-shell type design consisting of two housings connected together at a common end via a hinge for example. In most cases, a first or display housing is utilized to provide a viewable display to a user while a second housing includes an area for user input (e.g., touchpad and keyboard).

Meanwhile, tablet computing devices utilize a single touchscreen display and housing for both accepting user input and displaying images to an operating user. Still further, convertible touchscreen notebook computers represent a hybrid-type device and typically include a base housing for enabling standard input (e.g., keyboard) and a docking area for connecting with a tablet device so as to replicate traditional notebook functionality. However, when the tablet device is docked in the hybrid notebook configuration, the size and positioning of the tablet device often leads to an undesirable operating environment.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which:

FIG. 2A is a side view of a portable electronic device and dual-part hinge assembly when in a closed position, while

FIGS. 4A-4C are sides views of the portable electronic device and dual-part hinge assembly articulating from a closed to opened position according to an example of the present invention.

DETAILED DESCRIPTION OF THE INVENTION

Figure 1:
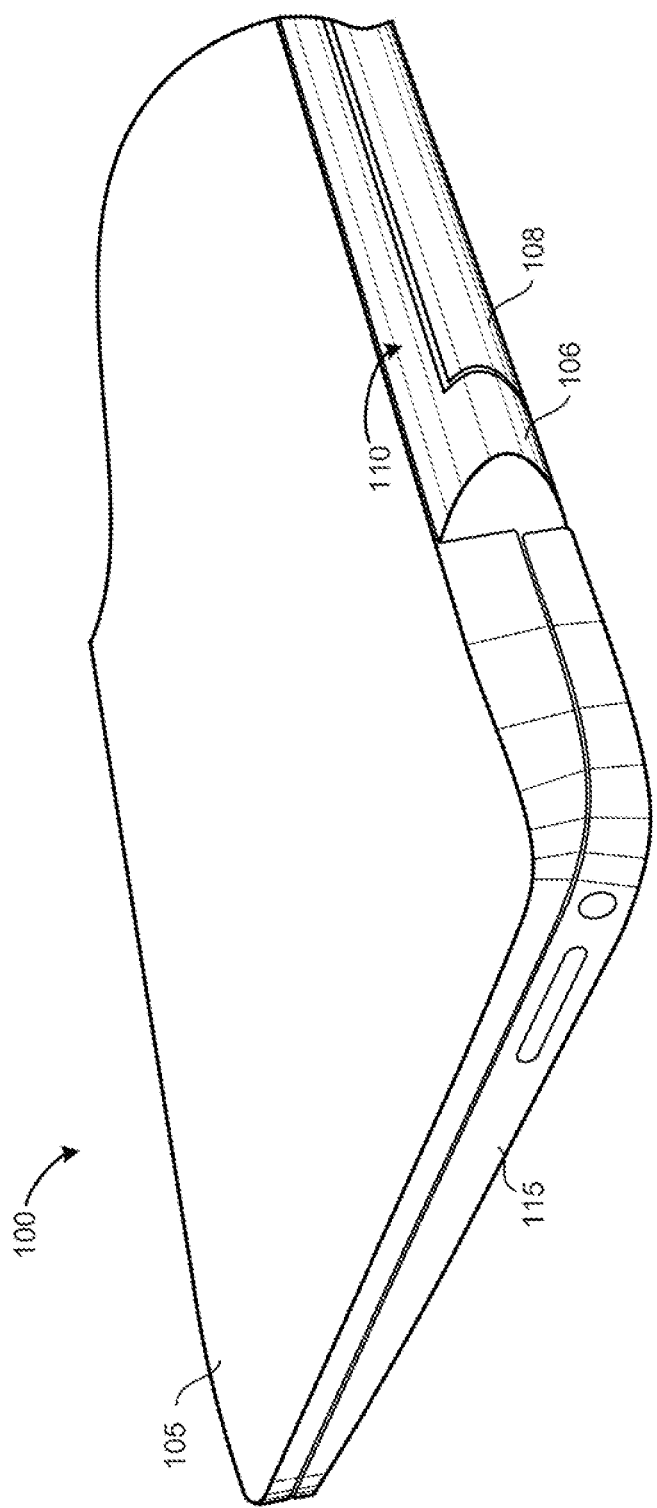
FIG. 1 is a three-dimensional perspective view of a portable computing device having a dual-part hinge assembly according to an example of the present invention.

The following discussion is directed to various examples. Although one or more of these examples may be discussed in detail, the implementations disclosed should not be interpreted, or otherwise used, as limiting the scope of the disclosure, including the claims. In addition, one skilled in the art will understand that the following description has broad application, and the discussion of any implementations is meant only to be an example of one embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

The hinge of a clam-shell computing device, such as those found on notebook and hybrid computing systems for example, are important for allowing quick and easy transition of the device from a closed position to an input operating mode. However, docking a tablet computing device to the base of a convertible computing system (creating a touchscreen notebook) may lead to an awkward weight distribution as the tablet device may be slightly heavier than the base housing. Consequently, when a user opens the convertible notebook and attempts to pursue a touch experience on the display, the weight imbalance on the hinge causes the display (i.e., tablet device) to undesirably tip backwards away from the user. Thus, there is a need in the art for a robust hinge mechanism that is able to effectively counterbalance uneven weight distribution of a convertible computing device so as to prevent the device from inadvertently tipping backwards when little to no force is applied on the attached touchscreen display housing (e.g., tablet device).

Examples described herein provide a dual-part hinge assembly for a portable electronic device. According to one example, the hinge assembly is capable of self-adjustment as the convertible notebook transitions from a closed to an open state. For instance, when the operating user opens the portable device, a stand portion of hinge assembly automatically deploys and detaches from a main hinge member so as to combat the center of gravity and provide more stability against the normal operating surface. As such, examples described herein aim to provide a dual-part hinge assembly that enables a more comfortable and reliable work environment when interacting with the touchscreen of a convertible or hybrid portable computing device.

Referring now in more detail to the drawings in which like numerals identify corresponding parts throughout the views, FIG. 1 is a three-dimensional perspective view of a portable computing device having a dual-part hinge assembly according to an example of the present invention. Here, the portable electronic device 100 includes an upper display 105 coupled with a base or input housing 115 via the dual-part hinge assembly 110. In one implementation, display 105 represents a tablet computing device that is docked with the computing system 100 via the hinge assembly 110. More particularly, the hinge assembly 110 includes a main portion 106 and a stand portion 106 for providing balancing support of the computing system 100 as will be shown and described in further detail below.

Figure 2A:
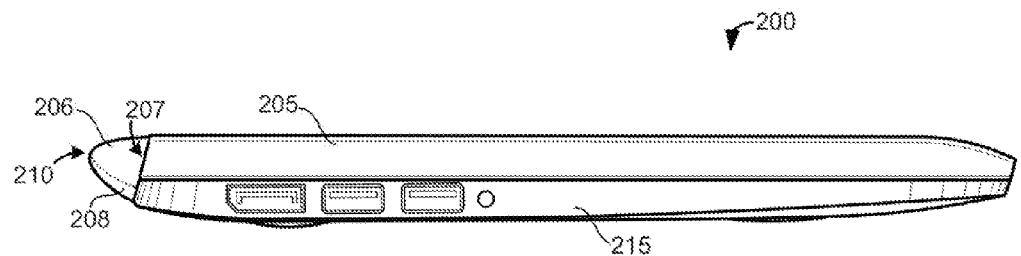
Figure 2B:
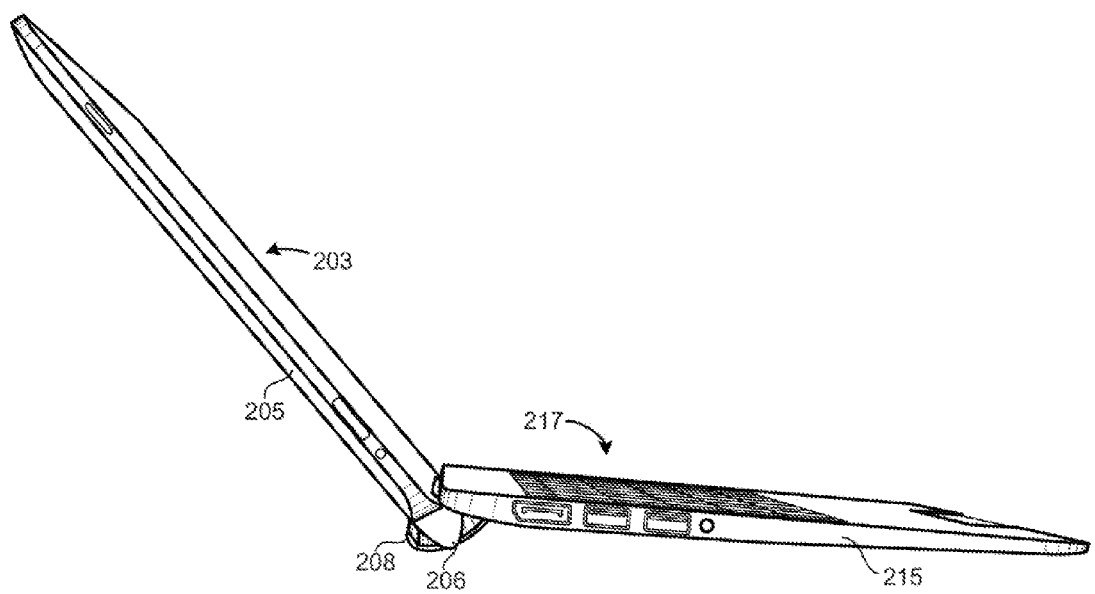
FIG. 2B is a side view of portable electronic device and dual-part hinge assembly when in an opened position according to an example of the present invention.

FIG. 2A is a side view of a portable electronic device and dual-part hinge assembly when in a closed position, while FIG. 2B is a side view of portable electronic device and dual-part hinge assembly when in an opened position according to an example of the present invention. FIG. 2A depicts the portable electronic device 200 in a closed operating state. That is, when in the closed state the display housing 205 is positioned immediately adjacent and vertically-aligned with the base housing 215. The hinge assembly includes a main portion 206 and a stand or stability support portion 208. In accordance with one example embodiment, the main portion 206 of the hinge assembly 210 is directly attached to base housing 215 and may include an attachment feature on a docking surface side 207 for coupling with a tablet computing device (e.g., display 205). For instance, the hinge assembly 210 may include a magnetic feature or similar attachment mechanism formed on a connection surface 207 to facilitate docking and coupling with a separate display device. As shown in FIG. 2B, the dual-part hinge assembly 210 is configured to releasably detach as the display 205 of the computing device 200 is transitioned to an opened and notebook operating mode in which the display surface 203 is rotated and moved away from the input surface 217 (e.g., rotated 135 degrees) of the base housing 215. Specifically, as the hinge assembly 210 rotates in turn with the coupled display 205, the stand portion 208 of the assembly 210 detaches and extends from the main portion 206 in order to serve as a support stand for the display housing 205 and computing device 200. That is when in the depicted opened state, the support stand 208 of the hinge assembly 210 remains fully-extended behind a rear surface (i.e., surface opposite display surface 203) of the display housing 205 and main portion 206 so as to provide a "foot rest" for enhanced stability during touch input operation. Without such a hinge assembly and due to uneven weight distribution caused by inclusion of the display device, very small force on the touch display surface 203 may be needed before the base housing 205 and keyboard area 217 rises from the normal surface and tips the computing device 200 backward and away from the user. According to one example, implementations of the dual-part hinge assembly may accommodate a minimum of 300 grams of force applied onto the touchscreen 203 while the computing device 200 rests on the normal operating surface.

Figure 3A:
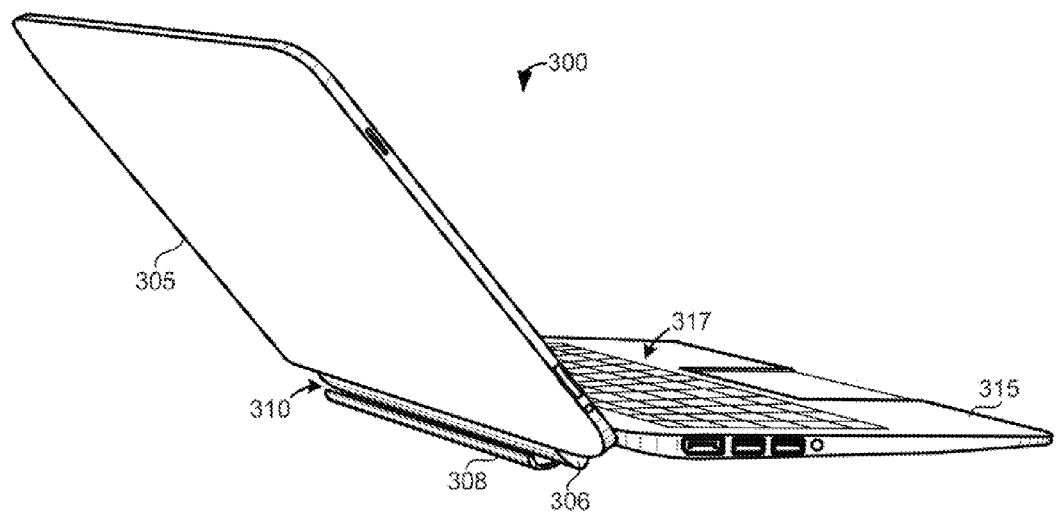
FIGS. 3A and 3B are three-dimensional perspective views of the portable electronic device and dual-part hinge assembly while in an opened position according to an example of the present invention.
Figure 3B:
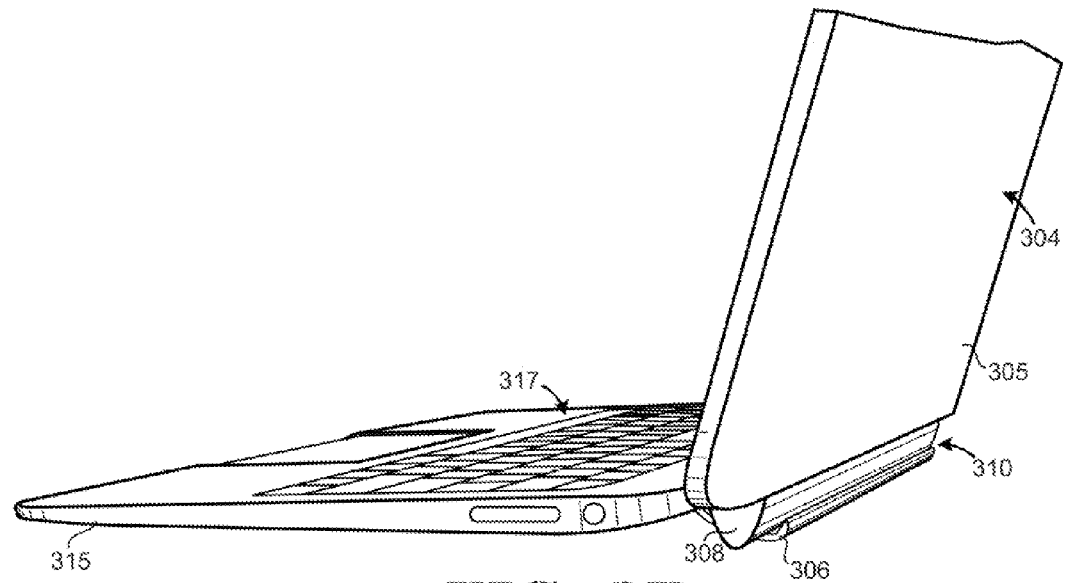

FIGS. 3A and 3B are three-dimensional perspective views of the portable electronic device and dual-part hinge assembly while in an opened position according to an example of the present invention. As shown in FIG. 3A, the portable electronic device 300, such a convertible notebook computer for example, is in an opened state in which both keyboard input on the base housing 315 and touch input on the display 305 may be accomplished by an operating user. Moreover, display 305 is held in place and rotated from the base housing 315 via the hinge assembly 310. According to one example, and as shown in FIG. 3B, when the display housing 305 is rotated past the plane perpendicular to the normal plane corresponding with the input surface 317, then the stand portion 308 of the hinge assembly 310 detaches from the main hinge portion 306 and extends away from the rear surface 304 of the display housing 305 and behind the main hinge portion 306.

FIGS. 4A-4C are sides views of the portable electronic device and dual-part hinge assembly articulating from a closed to open position according to an example of the present invention. FIG. 4A depicts the portable electronic device 400 moving from a closed state to an opened state. In particular, the display housing 405 is moved away from the input surface 417 of the base housing 415 to an elevated position. Furthermore, the hinge assembly 410 rotates in a manner corresponding to the movement of the display housing 405. According to one example, the support stand portion 408 of the hinge assembly 410 begins to detach from the main portion 406 of the hinge assembly 410 upon articulation and transition of the computing device to a normal input operating mode. Furthermore, FIG. 4B depicts the portable electronic device 400 in a semi-opened state in which the display housing 405 is substantially perpendicular to a normal plane associated with the input surface 417 and base housing 415. As the display housing 405 rotates further away from the keyboard surface 417 of the base housing 415 (indicated by directional arrow), the stand portion 408 of the dual-part hinge assembly 410 moves downward and becomes further removed from the main portion 406. Moreover, FIG. 4C depicts the portable electronic device 400 in a fully-opened position in which the display housing 405 is rotated further away (e.g., 135°) from the input surface 417 and past the perpendicular plane 425 with respect to the base housing 405. As shown here, the stand portion 408 of the hinge assembly is completely detached from main portion 406 of the hinge assembly 410 so as to provide stability support for the display housing 405 and computing device 400.

Figure 5A:
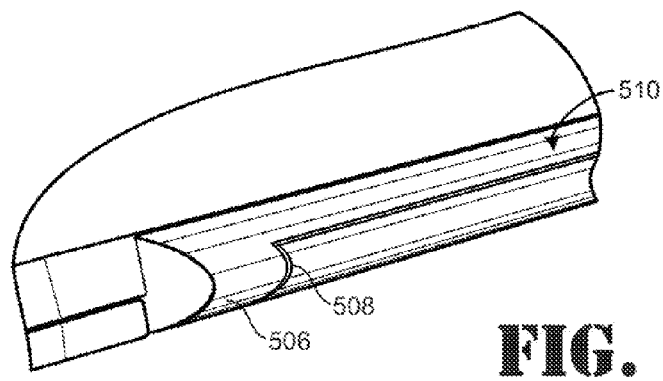
FIGS. 5A-5C are enlarged three-dimensional views of the dual-part hinge assembly articulating from a closed to open position according to an example of the present invention.
Figure 5B:
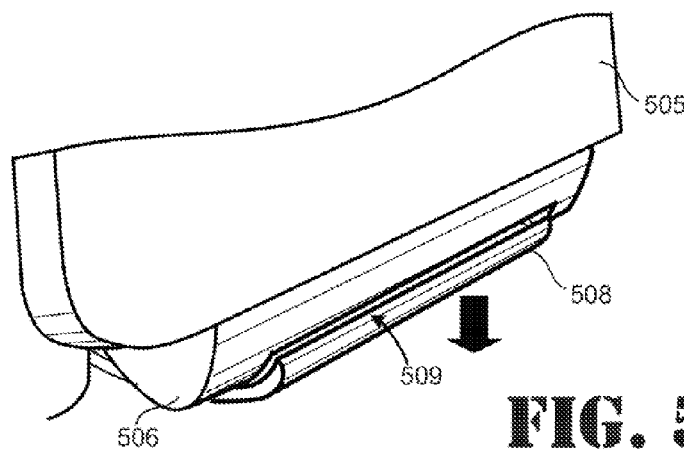
Figure 5C:
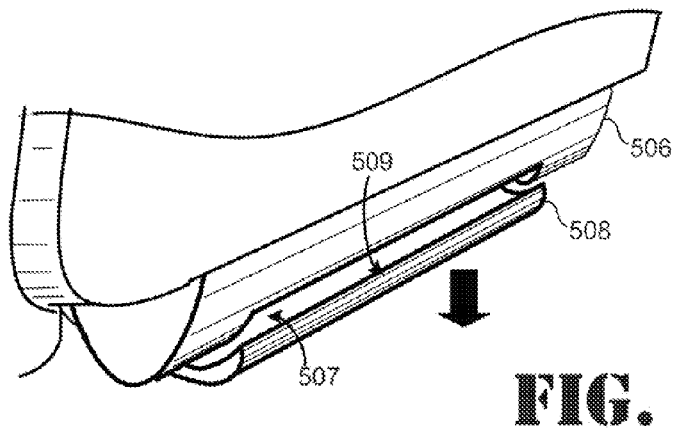

FIGS. 5A-5C are enlarged three-dimensional views of the dual-part hinge assembly articulating from a closed to open position according to an example of the present invention. FIG. 5A is an illustration of the dual-part hinge assembly 510 in a closed state. In one implementation, when in the closed state the stand portion 508 of the hinge assembly 510 is substantially flush with the main portion 506 of the hinge assembly 510. That is, the stand or support portion 508 is coupled to and integrated within the main portion 506 of the hinge assembly (via cavity area 507 shown in FIG. 5C). According to one example, the support member 508 is shorter in the length-wise direction than the main portion 506 of the hinge assembly 510 so as allow for reliable coupling and flush alignment of the support member 509 within the cavity area 507 of the main hinge portion 506. The support member 508 of the hinge assembly 510 may be coupled to the main portion 506 through use of a magnetic feature or similar attachment mechanism. Moreover, FIG. 5B depicts the display 505 transitioning from a closed position to an input operating mode or opened position. As shown in this implementation, the support stand 508 begins to decouple from the main portion 506 such that a coupling area 509 of the stand member 508 moves downward and away from the display housing 505 and main hinge portion 506. Additionally, and as shown in FIG. 5C, the coupling area 509 is configured to extend further away from the main portion 506 of the hinge assembly 510 as the display housing 505 is rotated further away from the input surface of the base housing (as shown in FIG. 4C). In one implementation, rotational force from the main portion 506 serves to push the support member 508 and coupling area 509 downward such that the support member 508 extends away from the display housing 505 and behind the main hinge portion 505 in order to provide reliable "kickstand" support while resting against the operating surface.

Figure 6A:
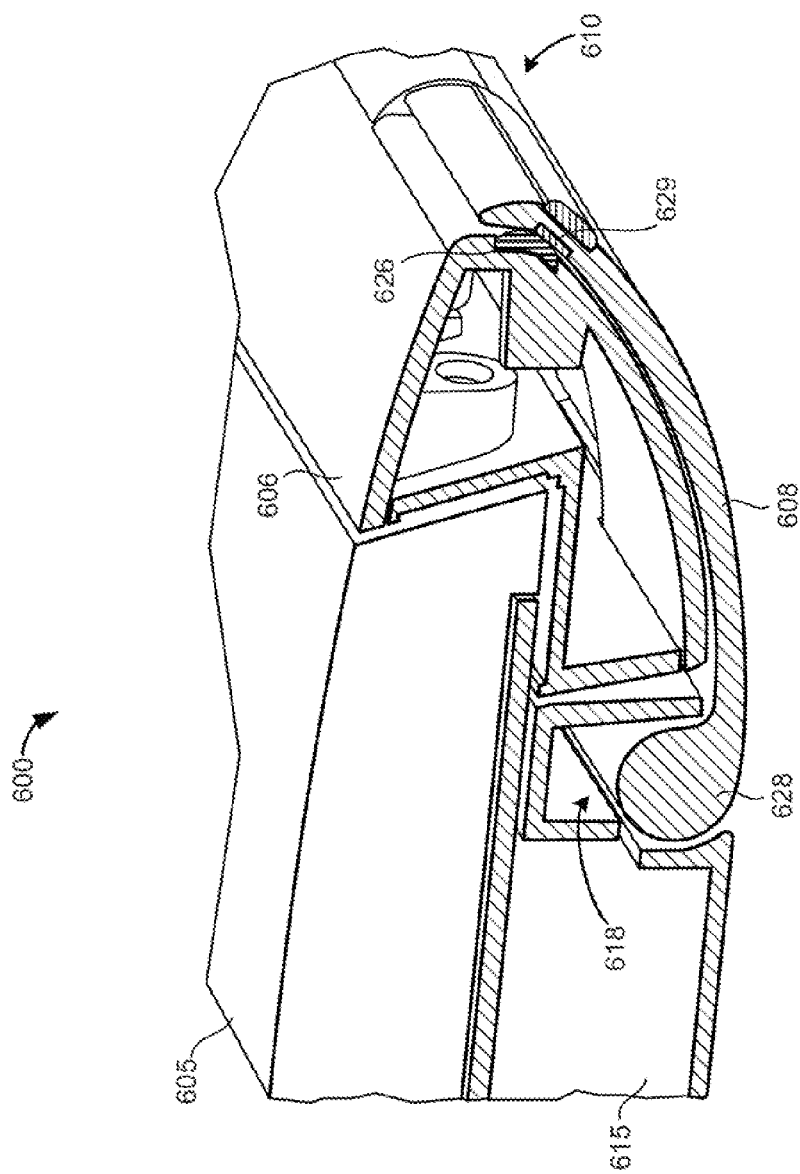
FIGS. 6A-6C are cross-sectional views of the dual-part hinge assembly articulating from a closed to open position according to an example of the present invention.
Figure 6B:
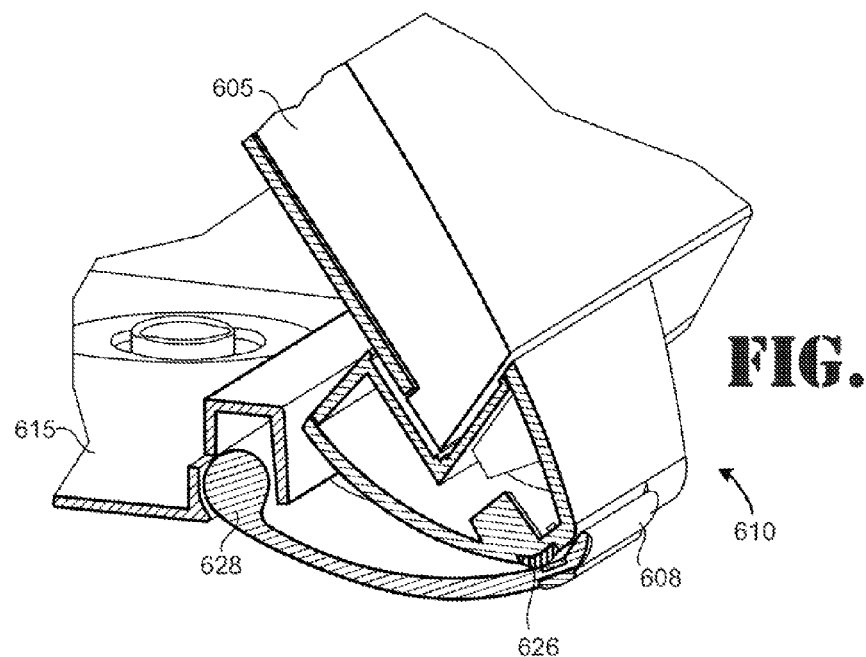
Figure 6C:
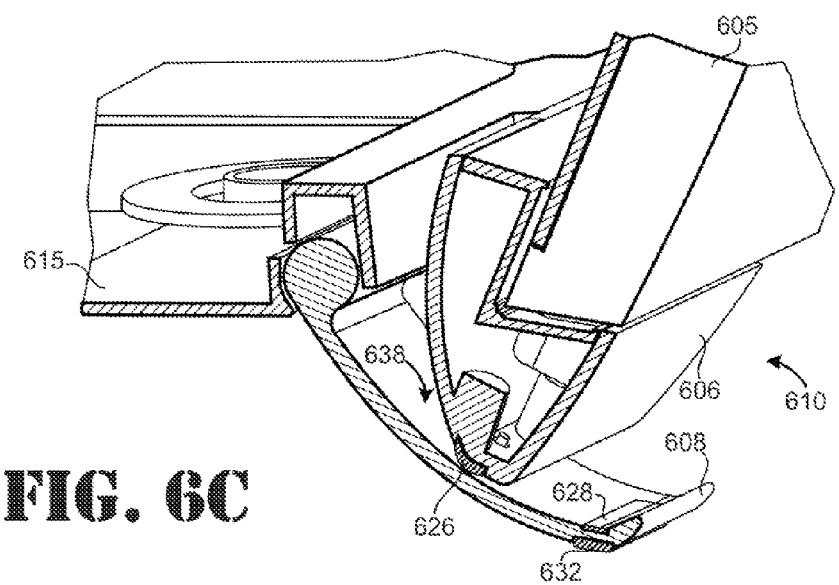

FIGS. 6A-6C are cross-sectional views of the dual-part hinge assembly articulating from a closed to open position according to an example of the present invention. As shown in FIG. 6A, the portable electronic device is in a closed position in which the display 605 is positioned immediately above and adjacent to the base housing 615. Furthermore, the base housing 615 includes an opening or cavity area 618 for receiving a rotatable joint element 628 associated with the support stand portion 608. The cavity area 618 is configured to provide sufficient frictional support that allows the rotatable joint element 628 to move while housed therein. The support stand portion 608 may also include a small inner groove 629 formed on an opposite side of the rotatable joint element 628 and corresponding in size and configured to mate with a protruding element 626 associated with the main hinge portion 606. And as shown in FIG. 6B, when the display 605 is rotated upwards and away from the base housing 615, the bump or protruding element 626 of the main hinge portion 606 disengages with the inner groove 629 of the support stand 608 and slides along an inner area 638 of the support stand portion 608. Consequently, the protruding element 626 of the main hinge portion exerts force on the inner area 638 of the support stand 608 and serves to push to the support stand 608 downward in a direction away from the display 605 via rotation of the rotatable joint element 628 within the base housing 615. FIG. 6C depicts the hinge assembly 610 and portable electronic device in an opened state. As shown here, the support stand 608 is configured to extend in a direction opposite the extension direction of the main portion 606 so as to form a "scissors" formation. That is, the support stand 608 extends in a direction away from the base housing 615 and behind the main hinge portion 606. In one implementation, the support stand 608 also includes a pad element 632 formed on outer side of the support stand 608 and opposite the inner groove 629. The pad element 632 may be used to provide cushion and padding support when the support stand portion 608 rests against the operating surface.

Examples provide a dual-part hinge assembly for a portable electronic device. Moreover, many advantages are afforded by the hinge assembly in accordance with implementations described herein. For instance, the dual-part hinge assembly utilizes existing functionality of a clam-shell portable electronic device (i.e., hinge) so as reduce the number of additional parts necessary for implementation. Moreover, incorporation of the stand support within the hinge assembly allows the portable electronic device to remain compact in size and form factor while providing a reliable support structure even when the portable device is opened at a wide angle (135 degrees) with respect to the base housing.

Furthermore, while the invention has been described with respect to particular examples, one skilled in the art will recognize that numerous modifications are possible. For instance, although examples described herein depict a convertible or hybrid computing system as the portable electronic device, the invention is not limited thereto. For example, the portable electronic device may be a netbook, a standard notebook computer, a smartphone, or any other electronic device having a clam-shell housing arrangement and configured for touch-based input from an operating user.

Not all components, features, structures, characteristics, etc, described and illustrated herein need be included in a particular example or implementation. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some examples have been described in reference to particular implementations, other implementations are possible according to some examples. Additionally, the arrangement or order of elements or other features illustrated in the drawings or described herein need not be arranged in the particular way illustrated and described. Many other arrangements are possible according to some examples.

The techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the techniques.

What is claimed is:

1. A computing device comprising: a display; a base housing including an input area; and a hinge assembly connecting the display to the base housing, wherein the hinge assembly comprises: first portion fixedly coupled to the display; and second portion rotatably coupled to the base housing, wherein the second portion comprises an inner surface covered along a surface of the first portion in a closed position; and the first portion slidably pivots along and against the inner surface and cause the second portion extends behind the first portion when the display transitions to an open position relative to the base housing so as to provide stability for the computing device.

2. The device of claim 1, wherein when the display is in a closed position with respect to the base housing and input area, the second portion of the hinge assembly is coupled to and lies flush with the first portion of the hinge assembly.

3. The device of claim 1, wherein the first portion of the hinge assembly includes a cavity area for positioning of the second portion within the first portion of the hinge assembly while in a closed state.

4. The device of claim 3, wherein the second portion of the hinge assembly includes a coupling area.

5. The device of claim 4, wherein when the display panel rotates from a closed position to an open position, the coupling area of the second portion of the hinge assembly disengages from the first portion of the hinge assembly.

6. The device of claim 4, wherein when the computing device is in the opened position, the second portion of the hinge assembly extends behind a rear surface of the display and the first portion so as to counterbalance uneven weight distribution of the computing device.

7. The device of claim 1, wherein base housing includes a cavity area for receiving a rotatable joint element associated with the second portion of the hinge assembly.

8. A dual-part hinge assembly comprising: a main portion to fixedly couple to a display associated with a portable computing device; and a support member to rotatably couple to a base housing associated with the portable computing device, wherein the support member comprises an inner surface covered along a surface of the main portion in a closed position; and the main portion slidably pivots along and against the inner surface and cause the support member is configured to extend behind the main portion when the display transitions to an open position relative to the base housing by the hinge assembly so as to provide stability for the portable computing device.

9. The assembly of claim 8, wherein the support member lies flush within a cavity area of the main portion of the hinge assembly when the computing device is in a closed position.

10. The assembly of claim 9, wherein when the display panel rotates from a closed position to an open position, a coupling area of the support member the hinge assembly detaches from the main portion.

11. The assembly of claim 8, wherein when the computing device is in the opened position, the support member of the hinge assembly extends behind a rear surface of the display and the main portion so as to counterbalance uneven weight distribution of the computing device.

12. The assembly of claim 8, wherein the base housing includes a cavity area for receiving a rotatable joint element associated with the support member of the hinge assembly.

13. A portable electronic device comprising:
    a base housing;
    a display; and
    a dual-part hinge assembly configured to provide rotational support for the display with respect to the base housing, wherein the hinge assembly comprises:
       a main portion fixedly coupled to the display; and
       a support stand member rotatably coupled to the base housing,
    wherein the support member lies flush against the main portion when the computing device is in a closed position,
    wherein when the tablet display rotates from a closed position to an open position, the main portion slidably pivots along and against the support stand member as the support stand member rotates downwards,
    and wherein when the computing device is in the opened position, the support member of the hinge assembly extends behind a main portion so as to counterbalance uneven weight distribution of the computing device.

14. The portable computing device of claim 1, wherein in a closed position of the display against the base housing, the first portion is flush against the second portion,
    and wherein during transition from the closed position to an open position of the display from the base housing, the first portion fixedly coupled to the display slidably pivots along and against the second portion, causing the second portion to rotate downwards relative to the base housing.

15. The portable computing device of claim 14, wherein the second portion has a surface against which the first portion is flush in the closed position,
    and wherein the first portion slidably pivots along and against the surface during the transition from the closed position to the open position.

16. The portable computing device of claim 1, wherein the second portion is rotatably coupled to the base housing at an axis of rotation at a corner of the base housing,
    and wherein during transition from a closed position of the display against the base housing to an open position of the display from the base housing, the second portion rotates downwards below the base housing.

17. The portable computing device of claim 16, wherein during the transition from the closed position to the open position, the first portion fixedly coupled to the display slidably pivots along the second portion.

18. The portable computing device of claim 17, wherein the second portion has a surface against which the first portion is flush in the closed position,
    and wherein the first portion slidably pivots along and against the surface during the transition from the closed position to the open position.

* * * * *